C. L. BASTIAN.
FLUID PRESSURE REGULATING VALVE.
APPLICATION FILED MAY 24, 1920.
1,408,924. Patented Mar. 7, 1922.
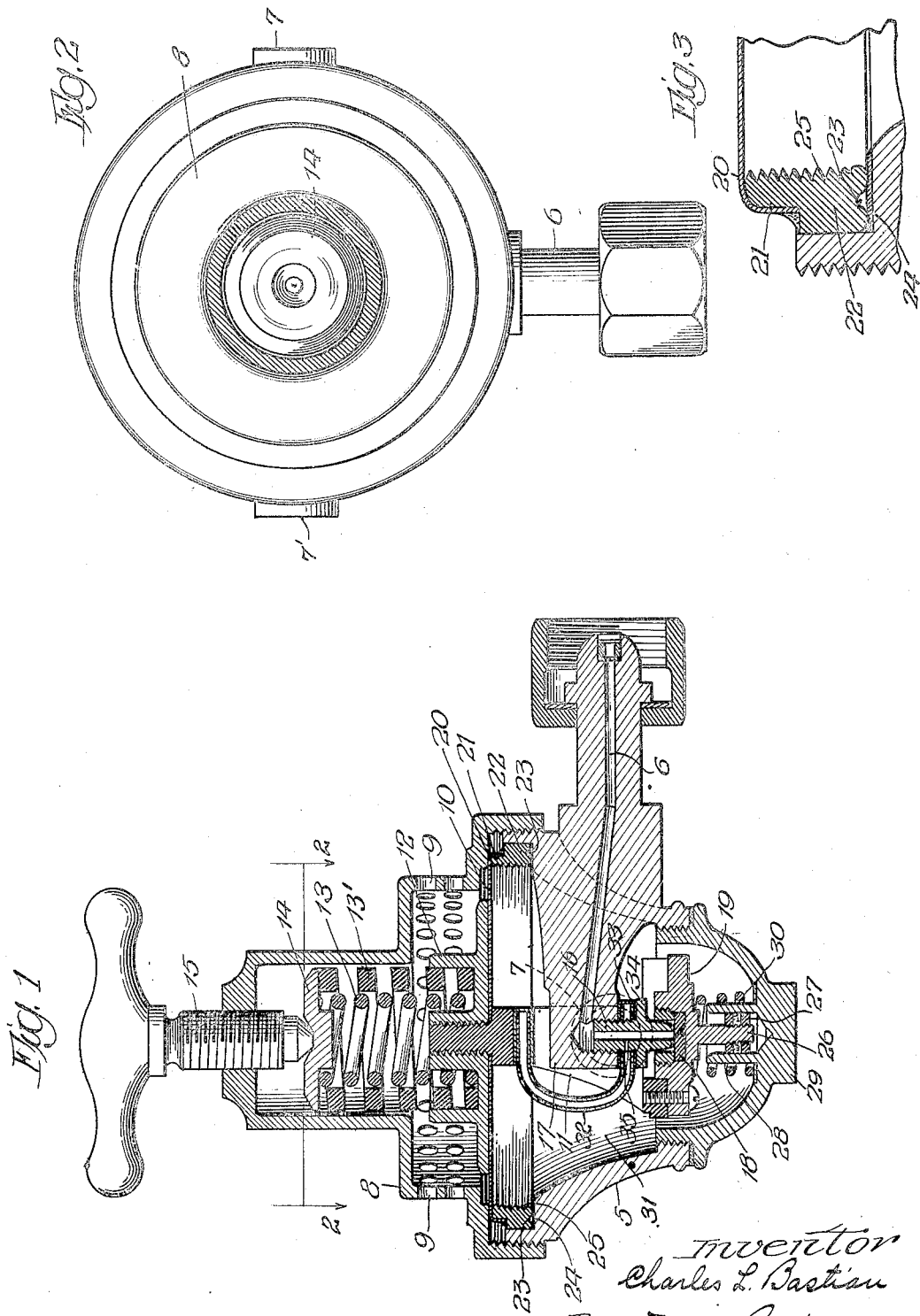

UNITED STATES PATENT OFFICE.

CHARLES L. BASTIAN, OF CHICAGO, ILLINOIS.

FLUID-PRESSURE-REGULATING VALVE.

1,408,924.  Specification of Letters Patent.  Patented Mar. 7, 1922.

Application filed May 24, 1920. Serial No. 383,645.

*To all whom it may concern:*

Be it known that I, CHARLES L. BASTIAN, a citizen of the United States, residing at Chicago, in the county of Cook and State of Illinois, have invented certain new and useful Improvements in Fluid-Pressure-Regulating Valves, of which the following is a specification.

This invention relates to improvements in fluid pressure regulating valves which are used for many purposes, including the regulation and delivery of gases to oxy-acetylene welding and cutting apparatus at desired pressures.

My invention has for its object generally to provide a pressure regulating valve of improved construction which makes it more substantial in service, more efficient in operation and more accurate in results than has heretofore been customary in such valves.

It has been the practice heretofore, to a more or less extent, to solder the diaphragm directly to the body of the valve but this has the disadvantage that when the diaphragm is broken or a leak occurs it is necessary to remove the entire valve to make repairs or to replace the diaphragm.

One of the particular objects of my invention is to mount the diaphragm in the valve in a novel manner which will permit of its being readily and easily removed for repair or replacement without taking down the entire valve and with very little trouble and expense.

In many cases these valves are employed for reducing a pressure as high as 1800 pounds in a supply tank to a working pressure of 6 to 8 pounds for general purposes and as low as 2 pounds for jewelers' torches and light welding work. While the valve is working the diaphragm floats between the pressure and the regulating springs and, because of the extreme sensitiveness required to satisfactorily secure the desired reduction of pressure, the diaphragm is inclined to flutter and correspondingly affect the flow of gas and impart a fluttering action to the jet. This tendency of the diaphragm to flutter produces a corresponding movement of the valve disk against the nozzle and results in undue and unnecessary wear on the disk.

Another object of the invention is to provide a retarding effect upon the operation of the diaphragm which will not lessen its sensitiveness but will prevent rapid and unnecessary vibration thereof.

Another difficulty with existing valves is the necessity for readjusting the regulating spring from time to time as the pressure supply reduces in order to maintain delivery of at least approximately the required volume of gas. Since such readjustment requires manual manipulation it is at best performed irregularly and spasmodically, and consequently an even flow of uniform volume of gas is only obtained where especial care is exercised.

A very important object of the invention is to automatically maintain the delivery of a predetermined volume of gas regardless of the fact that the pressure supply is constantly decreasing; and, more specifically my object is to utilize the pressure supply to automatically control the pressure sensitive means and enlarge the opening between the nozzle and the disk in proportion to the decrease of pressure supply to constantly maintain an even delivery of gas in a uniform volume.

In the drawings I have illustrated a selected embodiment of the invention and referring thereto—

Fig. 1 is a vertical section through a fluid pressure regulating valve embodying the invention;

Fig. 2 is a plan view partly in section on the line 2—2 of Fig. 1;

Fig. 3 is a detail enlarged sectional view.

Referring to the drawings, the valve casing comprises a body 5 provided with a gas inlet 6 and an outlet 7 through which the gas may be delivered to the work. A pressure gauge is generally connected to another opening 7' in the body located opposite the opening 7. A bonnet 8 is threadedly engaged with the body 5 and is preferably provided with openings 9 to permit instant escape of pressure without blowing off the bonnet in the event that the diaphragm is broken. The diaphragm 10 is secured between the yoke 11 and a flange collar 12 which threadedly engages the yoke. A pair of springs 13, 13', of relatively different strength, are disposed one within the other within the bonnet and engaging the collar 12. A button 14 forms a bearing for the adjusting screw 15 which operates through the bonnet. An inlet nozzle 16 is threadedly secured in the bridge 17 forming part of the body and this nozzle cooperates with a disk 18 which is carried by a support 19 secured to the yoke 11.

Heretofore it has been customary to secure the diaphragm directly to the body by soldering but if the diaphragm should break or spring a leak it becomes necessary to disconnect the entire valve in order to repair or replace the diaphragm. To obviate this difficulty and to facilitate repair or replacement of the diaphragm I solder the flanged edge 20 of the diaphragm to the reduced end 21 of a ring 22 which is provided with a peripheral groove 23 on its outer edge to form a suction seat against a lead gasket 24 on the body. Thus the diaphragm with its ring can be readily removed from the valve by disconnecting the bonnet from the body and the collar 12 from the yoke, and this can be done very easily and quickly and without disturbing the mounting of the valve, thereby enabling repairs or replacements to be made speedily and at comparatively low cost. I prefer to provide the ring with an interior thread 25 to facilitate chucking the ring for cleaning it after the diaphragm has been soldered thereto.

The valve nozzle and disk are preferably constructed in accordance with my invention as set forth in pending application Serial No. 272,421, filed January 22, 1919, but the present invention may be embodied in valves having nozzles and disks otherwise constructed, if desired. To prevent the disk from having a fluttering action with relation to the nozzle I provide the disk support 19 with an extension 26 constituting, in effect, a piston rod carrying the piston 27 which is arranged to operate in a cylinder 28 on the back cap 29 which is screw-threaded to the body 5. The piston is designed to operate in sufficient frictional engagement with the cylinder to retard the action of the diaphragm sufficiently to prevent the disk from fluttering against the nozzle when the pressure is reduced to only a few degrees which requires but a very small opening between the disk and nozzle. The spring 30 interposed between the back cap and the disk support acts as a balance to normally thrust the disk against the nozzle.

It is customary to turn the screw 15 to adjust the tension of the springs 13 and 13' to permit the desired pressure, as shown by the gauge, to be delivered to the work. The tension of the regulating springs overcomes the tension of balance spring 30 and operates the diaphragm to carry the disk 18 away from the nozzle sufficiently to admit pressure to the chamber 31 in the body at the predetermined pressure to be delivered. Since the screw adjustment is made with relation to the initial pressure supply it is apparent that as the pressure supply decreases the screw must be readjusted if the disk and the nozzle are to be preserved in proper operative relation to maintain the desired uniformity in delivery volume. As before stated, it has been customary in the past to manually adjust the screw from time to time while the valve is in use in an effort to proportion the tension of the springs to the pressure supply as the supply decreases. My invention takes care of this automatically by utilizing the pressure supply to control the spring tension after the initial setting so that the spring tension is automatically adjusted in proportion to the variation in pressure supply as the supply decreases.

In the drawings I have shown this feature of my invention embodied in a simple and efficient means comprising an elastic tube 32 adapted to bend anti-elastically under variation of pressure therein. I prefer to employ a tube of the type used commercially in the Bourdon gauge, but may use any other tube suitable for the purpose. One end of the tube is secured in a ring 33 which surrounds the nozzle and is clamped between the shoulder 34 on the nozzle and the bridge 17. A port 35 in the side of the nozzle admits pressure from the supply directly into the ring 33 from which it passes into tube 32. This tube is curved between its ends and its upper end projects above the bridge and bears directly against the yoke. The pressure supply tends to cause the curved tube to straighten out, thereby creating a pressure through the yoke against the diaphragm and regulating springs which varies with the pressure supply. Consequently, as the pressure supply decreases the pressure of the tube against the diaphragm and regulating springs correspondingly decreases and this permits the regulating springs to stretch slightly and increase the opening between the disk and the nozzle.

With this invention the same volume of gas is constantly delivered, at the desired pressure, regardless of variation in the pressure supply and without readjusting the regulating screw. The size of the opening between the disk and the nozzle is proportioned to the pressure supply automatically through the action of the tube under the influence of the pressure supply and the springs.

My present invention provides a regulating valve of superior construction and efficiency. The novel features are simple in character and do not complicate the construction. The advantages of the invention as well as the operation of the valve have been fully described and will be readily appreciated by those skilled in the art. From long experience in the manufacture of regulating valves it is my opinion that the construction herein illustrated and described is well adapted to secure the results sought for but I reserve the right to make all such changes therein as fairly fall within the scope of the following claims.

I claim:

1. In a pressure regulating valve, the combination of a casing providing a chamber having an inlet and an outlet, and pressure sensitive means for controlling the inlet to said chamber comprising a diaphragm, and a ring secured to the edge of the diaphragm and seated in said casing, said ring having a grooved edge to engage the casing.

2. In a pressure regulating valve, the combination of a casing providing a chamber having an inlet and an outlet, a soft metal seat in said casing, and pressure sensitive means for controlling the inlet to said chamber comprising a diaphragm, and a ring secured to the edge of the diaphragm and engaging said seat.

3. In a pressure regulating valve, the combination of a casing providing a chamber having an inlet and an outlet, pressure sensitive means for controlling the inlet to said chamber and comprising a valve disk normally engaging said inlet, and an elastic tube operated by the pressure supply for automatically increasing the extent of movement of said disk relatively to the inlet as the pressure supply decreases to maintain the inlet volume constant.

4. In a pressure regulating valve, the combination of a casing providing a chamber having an inlet and an outlet, a nozzle connected to said inlet, a valve disk to engage said nozzle, pressure sensitive means to control the movement of said valve disk relative to said nozzle and comprising a yoke, a diaphragm and spring tension on the diaphragm, and a Bourdon tube connected to the nozzle and operatively engaging the yoke and adapted to be operated by the pressure supply to automatically relieve the spring tension as the pressure supply decreases and maintain a constant inlet volume.

5. In a pressure regulating valve, a diaphragm, a ring secured to said diaphragm and means on the ring to facilitate chucking the ring and diaphragm for rotary movement.

6. In a pressure regulating valve, a diaphragm, a ring secured to said diaphragm and threads on the ring to facilitate chucking the ring and diaphragm for rotary movement.

CHARLES L. BASTIAN.